B. F. MILLER & W. J. REEVES.
Cotton-Seed Planters.

No. 158,727.

Patented Jan. 12, 1875.

WITNESSES:
A Bennerkendorf
D Sedgwick

INVENTOR:
B. F. Miller
W. J. Reeves

BY

ATTORNEYS.

UNITED STATES PATENT OFFICE.

BENJAMIN F. MILLER AND WILLIAM J. REEVES, OF GATESVILLE, TEXAS, ASSIGNORS OF ONE-HALF THEIR RIGHT TO JAMES M. MORRIS AND EDWARD A. JONES.

IMPROVEMENT IN COTTON-SEED PLANTERS.

Specification forming part of Letters Patent No. 158,727, dated January 12, 1875; application filed January 5, 1874.

*To all whom it may concern:*

Figure 1:
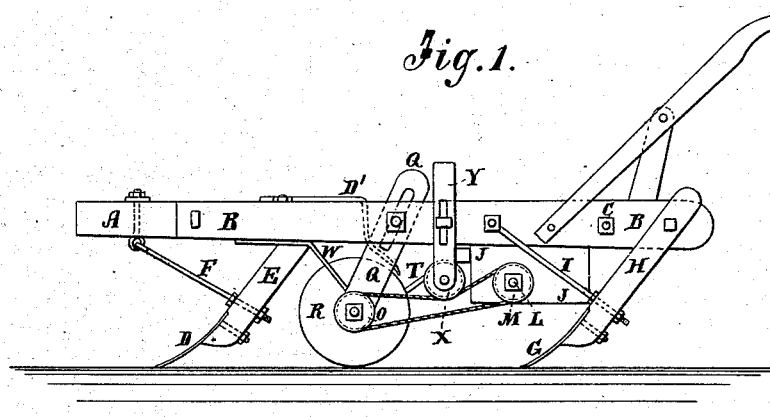
Figure 2:
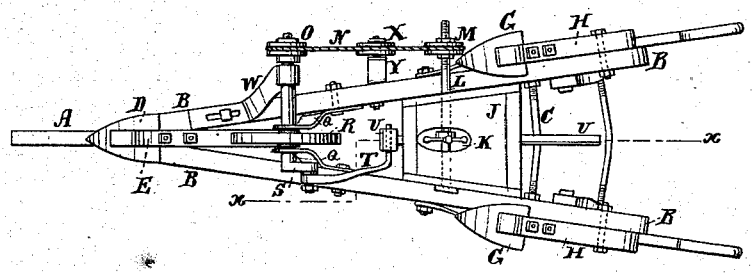
Figure 3:
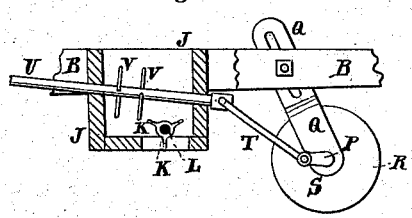
Figure 4:
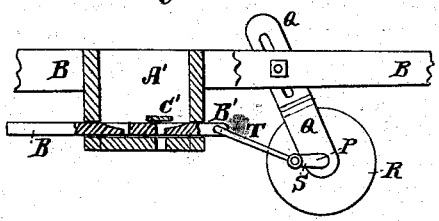

Be it known that we, BENJAMIN F. MILLER and WILLIAM J. REEVES, of Gatesville, in the county of Coryell and State of Texas, have invented a new and useful Improvement in Cotton-Seed Planters, of which the following is a specification:

Figure 1 is a side view of our improved machine. Fig. 2 is a bottom view of the same. Fig. 3 is a detail section, taken through the line $x\ x$, Fig. 2, shown as adjusted for planting cotton. Fig. 4 is the same view as Fig. 3, but shown as adjusted for planting corn.

Similar letters of reference indicate corresponding parts.

The invention will first be fully described, and then pointed out in the claim.

A is a beam, to the forward end of which the draft is applied. B are the side beams, the forward ends of which are inclined toward each other, and are bolted to the opposite sides of the beam A. The beams B are connected with the rear end of the beam A by a long bolt, and are kept at the proper distance apart by blocks interposed between the said beams B and the rear end of the said beam A. The inclination or distance apart of the beams B is regulated by varying the thickness of the said blocks. The rear ends of the beams B are connected and held in their proper relative position by a rod, C, having a screw-thread cut upon each end. Each end of the rod C passes through one of the beams B, and has two nuts screwed upon it, one upon each side of the said beam B. D is the plow that opens the furrow to receive the seed, and which is secured to the lower end of the standard E. Upon the upper end of the standard E is formed a tenon, which enters a mortise in the lower side of the rear end of the draft-beam A, where it is secured in place by a bolt, the said mortise and tenon being so formed that the standard may be moved forward and back to adjust the plow to work deeper or shallower in the ground, as may be desired. The draft strain upon the standard E is sustained by the brace-rod F, the forward end of which is pivoted to the lower side of the forward part of the beam A, and its rear end passes through the standard E, and has a screw-thread cut upon it to receive two nuts, which are screwed upon it, one upon each side of the standard E, so that the pitch of the standard may be adjusted by adjusting the said nuts. G are the covering-plows, which are attached to the lower ends of the standards H, the upper ends of which are bolted to the outer side of the rear ends of the side beams B, and the draft strain upon which is sustained by the braces I, the forward ends of which are pivoted to the outer sides of the beams B. J is the seed-hopper, which is so formed as to fit into the space between the beams B, to which it is securely, but detachably, bolted. K are teeth or short arms attached to a shaft, L, which revolves in bearings in the lower part of the sides of the hopper J in such positions that the teeth K may project through a slot in the bottom of the hopper J, so as to force the cotton-seeds out through said slot. To the projecting end of the shaft L is attached a pulley, M, around which passes a belt, N, which also passes around a pulley, O, attached to the projecting end of the shaft P, which passes through and revolves in bearings in the lower ends of the arms Q, the upper ends of which are bolted to the inner sides of the beams B, said bolts passing through longitudinal slots in said arms, so that the arms may be raised and lowered by simply loosening the said bolts. To the shaft P, between the lower ends of the arms Q, is attached a wheel, R, which receives motion from contact with the ground. To the other end of the shaft P is attached a short crank, S, to the crank-pin of which is pivoted the forward end of the connecting-rod T, upon the rear end of which is formed a hook, which passes through a transverse hole in the forward end of the rod U, which slides back and forth in holes in the forward and rear ends of the hopper J. To the sliding rod U, within the hopper J, are attached one, two, or more cross-pins, V, which keep the seed in the lower part of the hopper J stirred up so that the teeth K may carry it out uniformly, and without fail. The end of the shaft P, to which the pulley O is attached, is supported against the draft strain of the belt N by an arm, W, through bearings in the lower end of which the said shaft revolves, and the upper end of which is bolted to the beam B, a slot being formed in the said arm to receive the said bolt, so that the arm W may be adjusted to correspond with the adjustment of the arms Q. X is an idler, which is pivoted to the lower end of the arm Y, and rests upon the upper part of the band N. B' is a slide, which works in a groove or recess in the bottom of the hopper A', and its ends pass out through holes in the front and rear sides of said hopper. The slide B' has two holes formed in it to receive the corn, and carry it over the discharge-hole in the hopper bottom, through which it drops to the ground. C' is a guard or cut-off attached to the hopper bottom, directly over the discharge-opening, so as to prevent any more seed than enough to fill the cavities or cups of the dropping-slide. In the forward end of the slide B is formed a hole to receive the hook of the connecting-rod T, so that the said slide B' may be driven by the advance of the machine. The face of the wheel R is kept clean by a scraper, D', which passes up between the arms Q, and its upper end is bent forward to project along the rear part of the central beam A, to which it is secured by a bolt, said bolt passing through a slot in the said scraper to enable it to be adjusted according to the adjustment of the arms Q W'.

Having thus described our invention, we claim as new, and desire to secure by Letters Patent—

The combination, with open-bottomed hopper J, of the sliding stirrer U V, and rotary distributer K L, as and for the purpose specified.

BENJAMIN F. MILLER.
WILLIAM J. REEVES.

Witnesses:
J. H. CHRISMAN,
THOS. B. ROCK.